(12) United States Patent
Takahashi

(10) Patent No.: US 11,340,444 B2
(45) Date of Patent: May 24, 2022

(54) PHOSPHOR MEMBER, LIGHT SOURCE DEVICE, PROJECTOR AND CHROMATICITY ADJUSTMENT METHOD

(71) Applicant: NEC Display Solutions, Ltd., Tokyo (JP)

(72) Inventor: Isao Takahashi, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/757,282

(22) PCT Filed: Nov. 20, 2018

(86) PCT No.: PCT/JP2018/042804
§ 371 (c)(1),
(2) Date: Apr. 17, 2020

(87) PCT Pub. No.: WO2019/102987
PCT Pub. Date: May 31, 2019

(65) Prior Publication Data
US 2021/0195151 A1 Jun. 24, 2021

(30) Foreign Application Priority Data

Nov. 20, 2018 (WO) .................. PCT/JP2018/042804

(51) Int. Cl.
*G02B 26/00* (2006.01)
*G01J 3/50* (2006.01)
(Continued)

(52) U.S. Cl.
CPC ............ *G02B 26/008* (2013.01); *G01J 3/505* (2013.01); *G03B 21/204* (2013.01); *H04N 9/3164* (2013.01); *H04N 9/3182* (2013.01)

(58) Field of Classification Search
None
See application file for complete search history.

(56) References Cited

U.S. PATENT DOCUMENTS 3,838,816 A * 10/1974 Huff .................. B05B 17/08
239/18
5,668,572 A * 9/1997 Meyer ................ G02B 26/008
345/697

(Continued)

FOREIGN PATENT DOCUMENTS

CN 106597786 A 4/2017
CN 106842784 A 6/2017
(Continued)

OTHER PUBLICATIONS

United States Office Action dated Aug. 19, 2020 in U.S. Appl. No. 16/648,578.

(Continued)

*Primary Examiner* — John W Miller
*Assistant Examiner* — Sean N. Haiem
(74) *Attorney, Agent, or Firm* — McGinn IP Law Group, PLLC

(57) ABSTRACT

A phosphor member includes: a phosphor plate that converts a part of excitation light into fluorescent light and emits mixed color light including the fluorescent light and the remaining part of the excitation light; and a reflective layer that is provided on the phosphor plate and that transmits a part of the mixed color light and reflects the remaining part.

19 Claims, 9 Drawing Sheets

(51) Int. Cl.
*G03B 21/20* (2006.01)
*H04N 9/31* (2006.01)

(56) References Cited

U.S. PATENT DOCUMENTS

| | | | |
|---|---|---|---|
| 8,354,790 B2* | 1/2013 | Iwanaga | G03B 21/204 |
| | | | 313/506 |
| 2002/0109821 A1* | 8/2002 | Huibers | G02B 26/023 |
| | | | 353/84 |
| 2004/0008288 A1* | 1/2004 | Pate | H04N 9/3182 |
| | | | 348/742 |
| 2006/0268387 A1 | 11/2006 | Lianza | |
| 2008/0100533 A1 | 5/2008 | Chuang | |
| 2009/0284148 A1* | 11/2009 | Iwanaga | G02B 27/1073 |
| | | | 313/506 |
| 2011/0096296 A1 | 4/2011 | Ogawa | |
| 2012/0062857 A1* | 3/2012 | Saitou | G02B 5/22 |
| | | | 353/98 |
| 2012/0106126 A1* | 5/2012 | Nojima | G03B 33/08 |
| | | | 362/84 |
| 2014/0140038 A1 | 5/2014 | Gerets | |
| 2014/0146293 A1 | 5/2014 | Hirata et al. | |
| 2015/0205190 A1* | 7/2015 | Fukami | H04N 9/3111 |
| | | | 353/31 |
| 2016/0077417 A1* | 3/2016 | Ishikawa | G03B 21/2013 |
| | | | 353/20 |
| 2017/0289511 A1* | 10/2017 | Usami | H04N 9/3155 |
| 2018/0199013 A1 | 7/2018 | Wu | |
| 2019/0211263 A1* | 7/2019 | Maeda | C09K 11/02 |
| 2019/0369469 A1* | 12/2019 | Ishige | F21V 29/51 |

FOREIGN PATENT DOCUMENTS

| | | |
|---|---|---|
| JP | 4978556 B2 | 4/2011 |
| JP | 2012-047951 A | 3/2012 |
| JP | 2012-088657 A | 5/2012 |
| JP | 2014-235323 A | 12/2014 |
| JP | 2015-129783 A | 7/2015 |
| JP | 2015-138045 A | 7/2015 |
| JP | 2016-058638 A | 4/2016 |
| JP | 2016-161738 A | 9/2016 |
| JP | 2016-224115 A | 12/2016 |
| JP | 2017-142459 A | 8/2017 |
| JP | 2017-161641 A | 9/2017 |
| KR | 10-2017-0078385 A | 7/2017 |
| WO | WO 2016/009533 A1 | 1/2016 |
| WO | WO 2016/051537 A1 | 4/2016 |

OTHER PUBLICATIONS

International Search Report (ISR) (PCT Form PCT/ISA/210), in PCT/JP2018/642804, dated Feb. 26, 2019.
Chinese Office Action, dated Mar. 16, 2021, in Chinese Application No. 201880075455.6 and English Translation thereof.
United States Notice of Allowance dated Jul. 28, 2021 in U.S. Appl. No. 16/648,578.

* cited by examiner

[Fig. 1A]
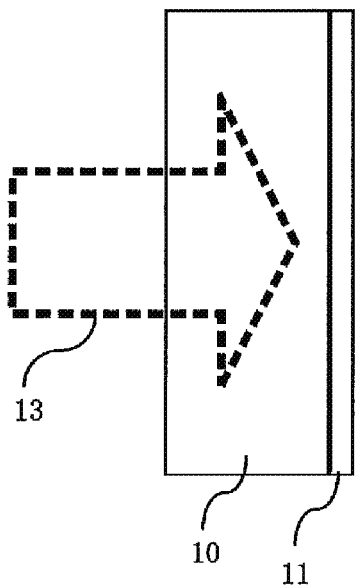
[Fig. 1B]
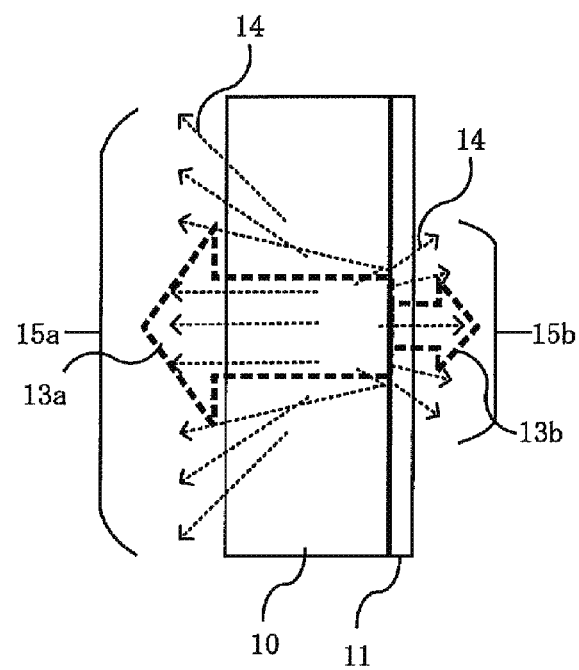

[Fig. 2]
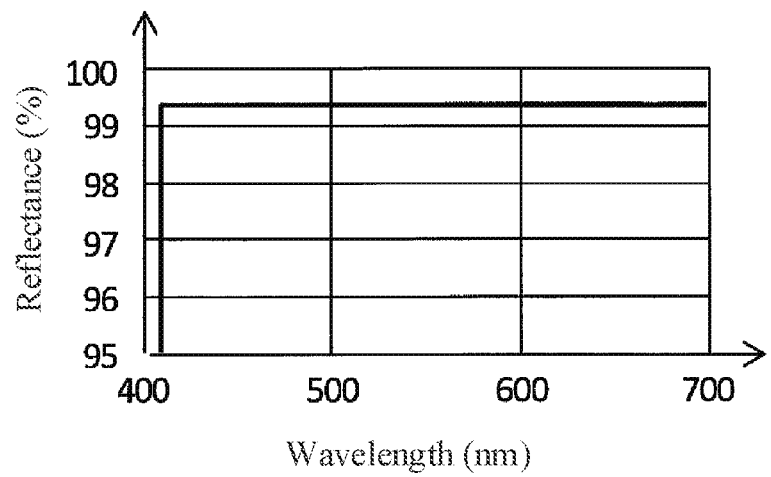
[Fig. 3A]
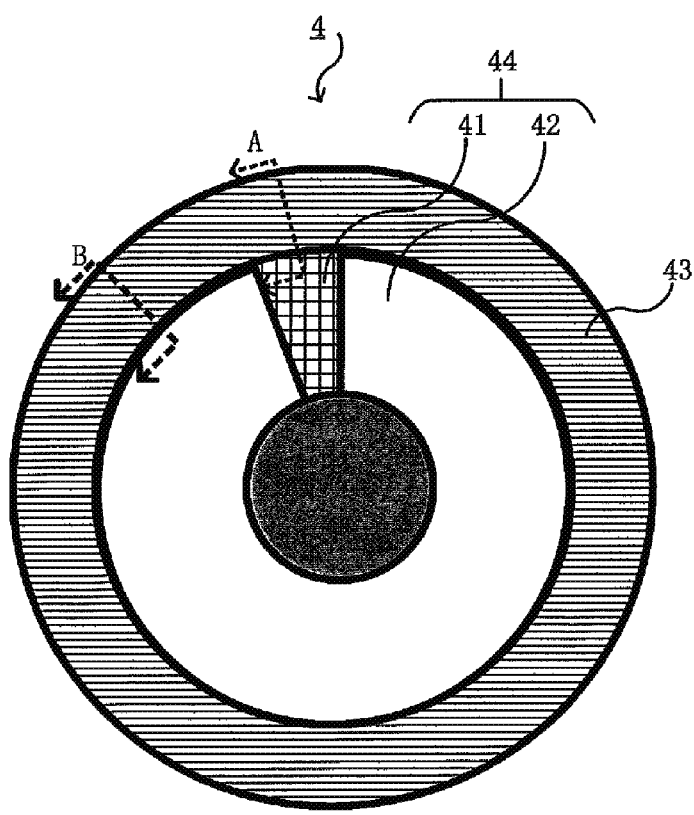

[Fig. 3B]
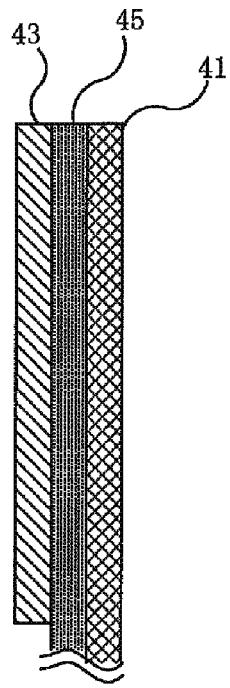
[Fig. 3C]
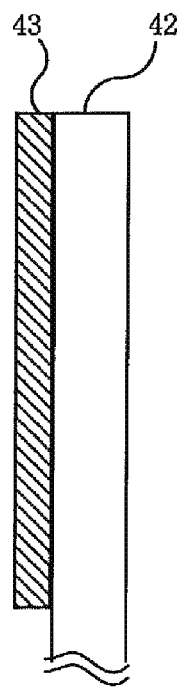

[Fig. 4]
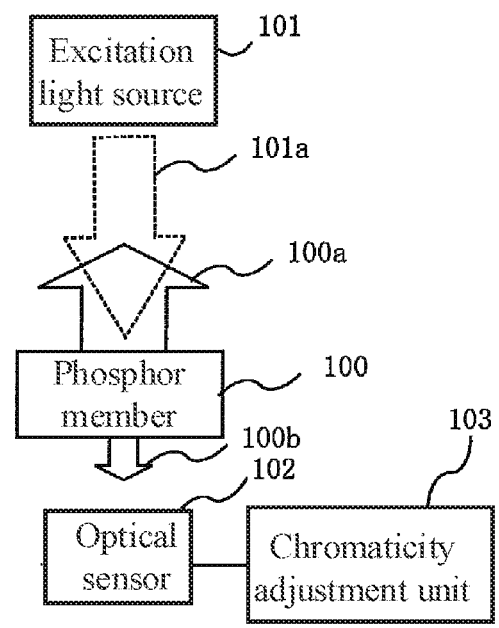
[Fig. 5]
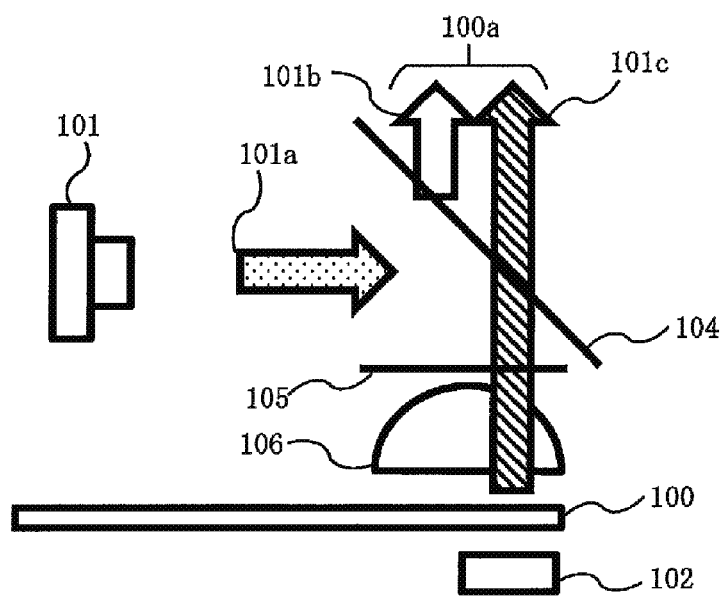

[Fig. 6]
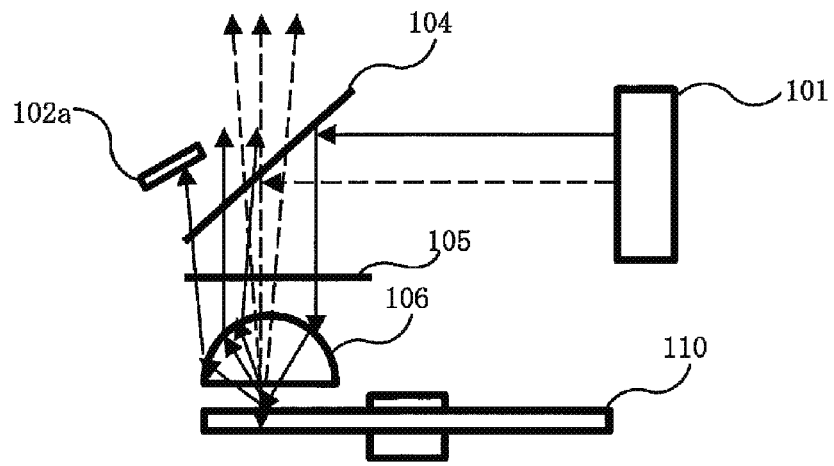
[Fig. 7]
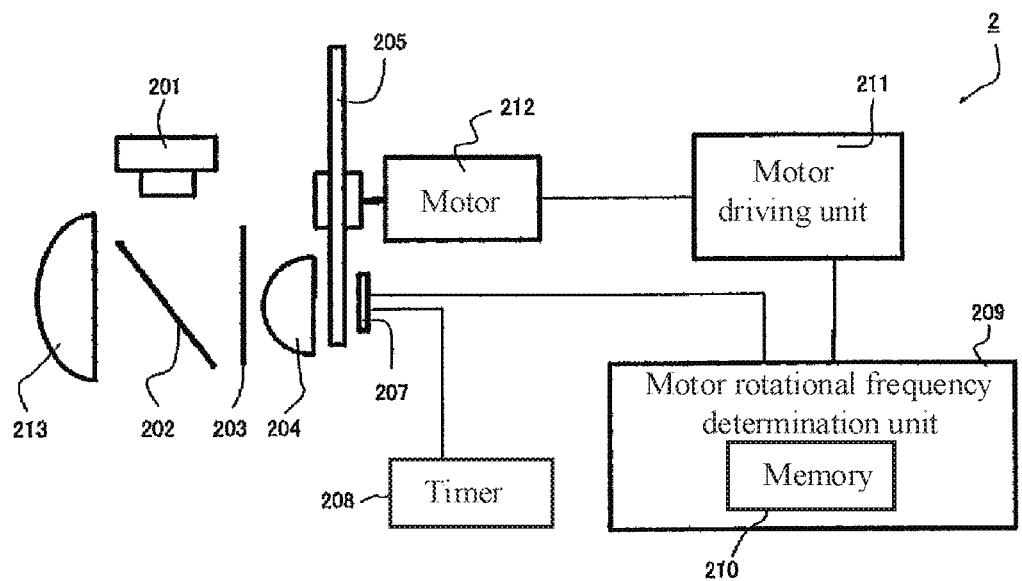

[Fig. 8]
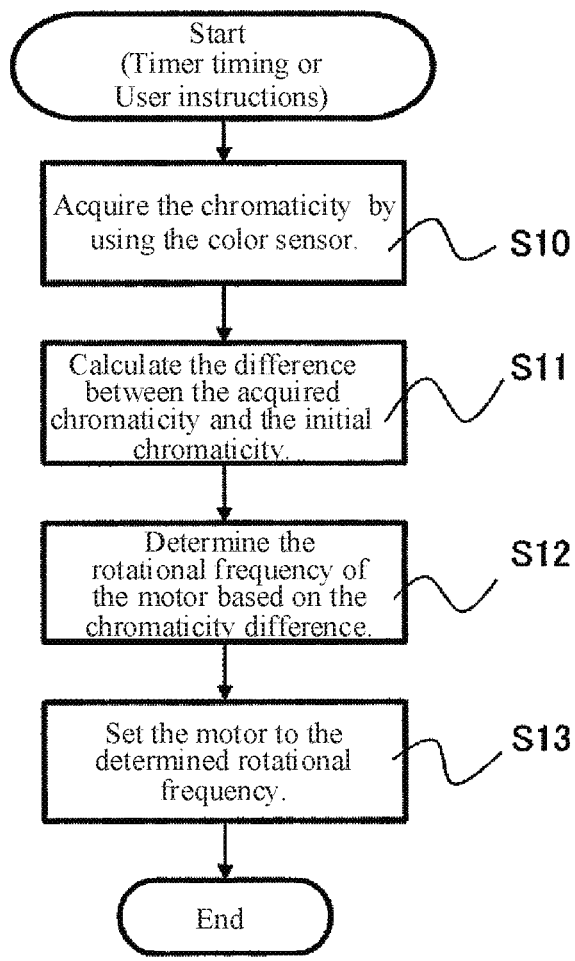
[Fig. 9]
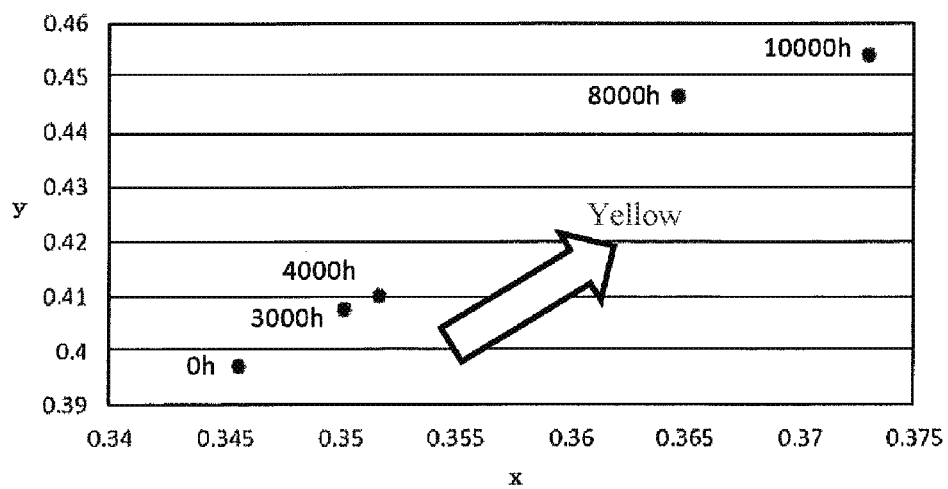

[Fig. 10]
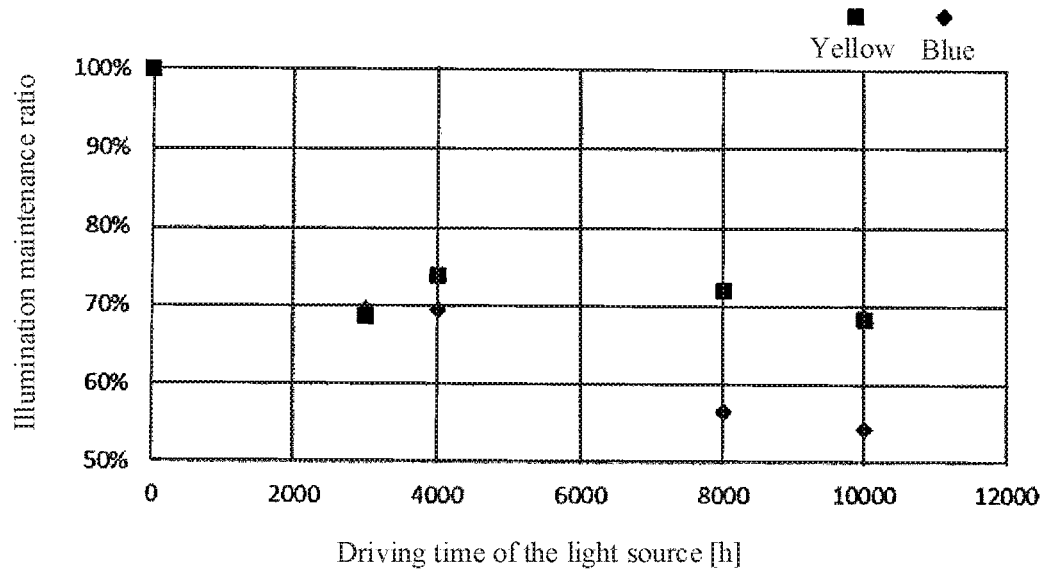
[Fig. 11]
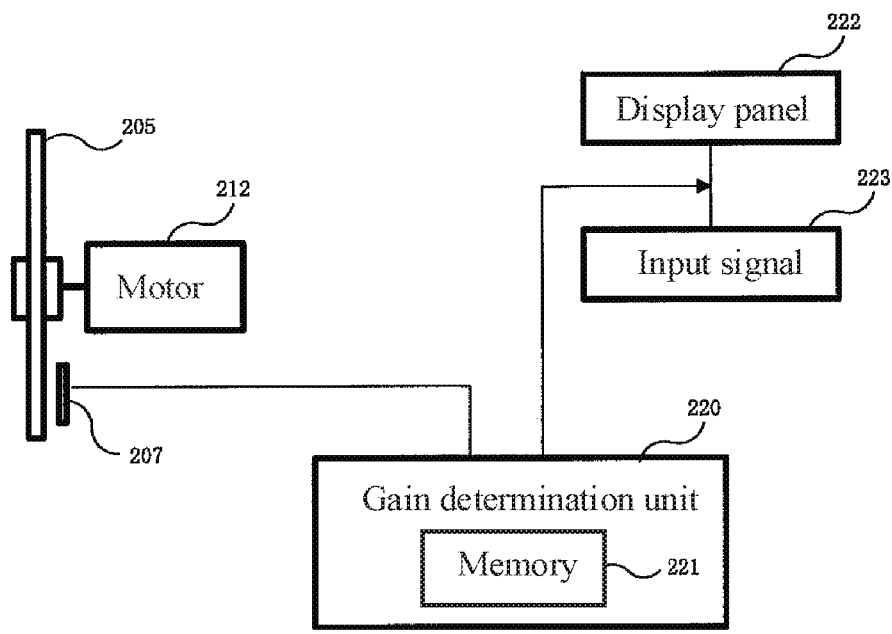

[Fig. 12]
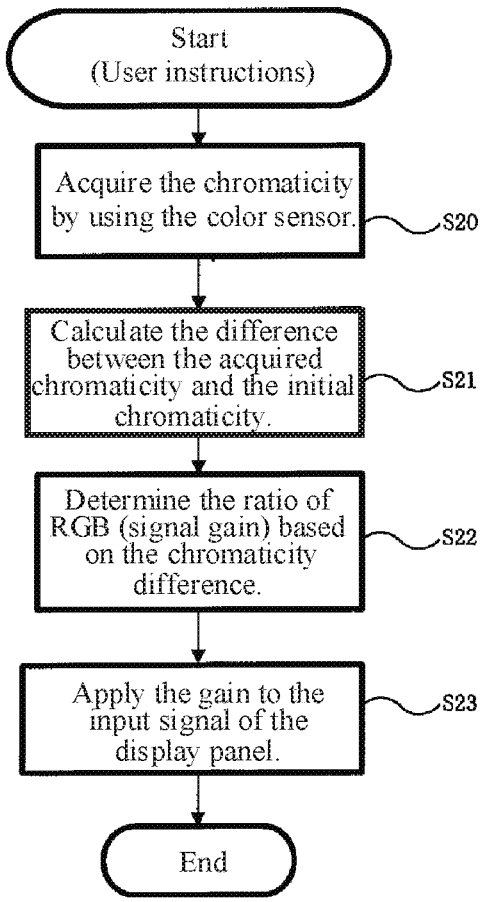
[Fig. 13]
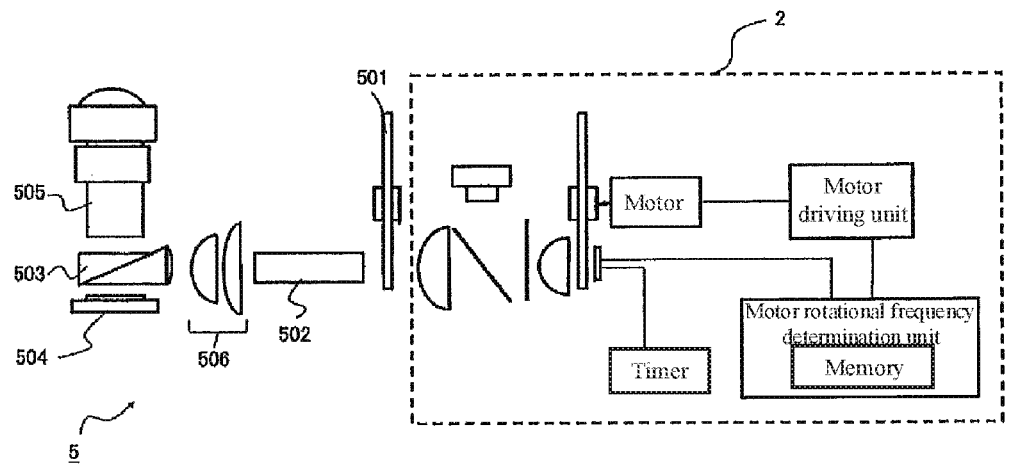

[Fig. 14]
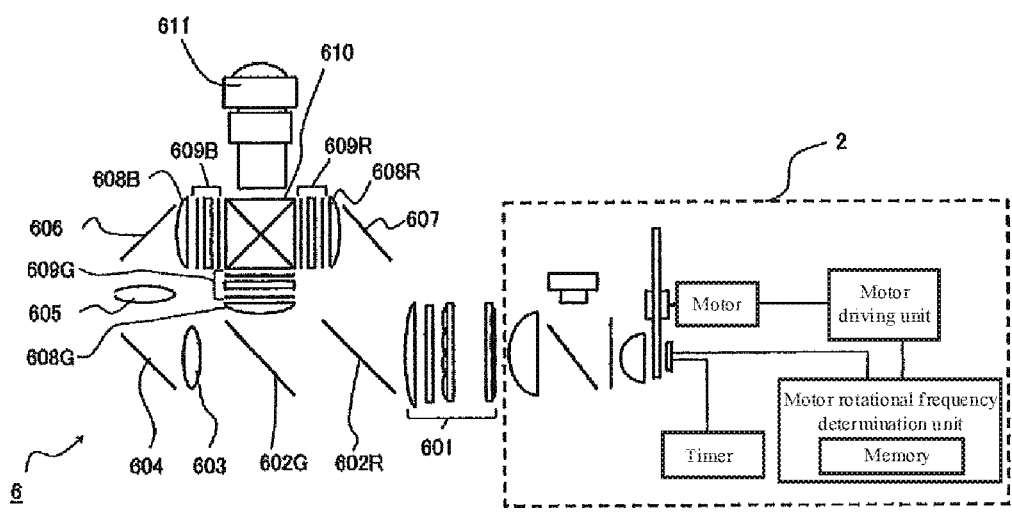

PHOSPHOR MEMBER, LIGHT SOURCE DEVICE, PROJECTOR AND CHROMATICITY ADJUSTMENT METHOD

TECHNICAL FIELD

The present invention relates to a phosphor member, a light source device, a projector, and a chromaticity adjustment method.

BACKGROUND ART

Some recent projectors include a light source device that combines a phosphor with a solid-state light source such as an LD (Laser Diode) or an LED (Light Emitting Diode) to obtain white light.

Patent Document 1 describes an example of the light source device. The light source device described in Patent Document 1 includes an excitation light source that emits blue excitation light and a phosphor wheel. The phosphor wheel includes a rotatable rotation substrate and a phosphor layer formed on the rotation substrate over the entire periphery. Excitation light is condensed onto the phosphor layer via a condenser lens. The phosphor layer includes a phosphor that is excited by excitation light to emit yellow fluorescent light. Excitation light is irradiated to the phosphor layer in a state in which the rotation substrate is rotated at a constant rotation speed. A part of the excitation light passes through the phosphor layer, and the remaining part is converted into yellow fluorescent light by the phosphor. Blue light (excitation light) that passed through the phosphor layer and yellow fluorescent light that is emitted by the phosphor are synthesized to obtain white light. The white light can be called a mixed light of excitation light and fluorescent light.

LITERATURE OF THE PRIOR ART

Patent Literature

Patent Document 1: JP-A-2012-088657

DISCLOSURE OF THE INVENTION

Problems to be Solved by the Invention

In the light source device described in Patent Document 1, when the excitation light source is used for a long period of time, the amount of excitation light emitted by the excitation light source may be reduced. This reduction in the amount of excitation light is called deterioration of the excitation light source. In addition, the phosphor has a property in which conversion efficiency of converting excitation energy obtained from excitation light to fluorescent light decreases as the temperature of the phosphor increases. This conversion efficiency of fluorescent light is also called internal quantum efficiency.

When the excitation light source deteriorates, the amount of excitation light decreases, and the amount of blue light included in white light decreases. In addition, since the amount of excitation light irradiated to the phosphor is decreased and the temperature of the phosphor is decreased, the conversion efficiency of fluorescent light is increased and the amount of fluorescent light included in white light is increased. As a result, the hue of white light changes.

As described above, the light source device disclosed in Patent Document 1 has a problem in which the hue of light emitted from the light source device changes due to deterioration of the excitation light source or the like.

In order to adjust the hue of light emitted from the light source device, it is desirable to directly monitor the mixed light of excitation light and fluorescent light to accurately detect the chromaticity of the mixed light.

It is an object of the present invention to provide a phosphor member, a light source device, a projector, and a chromaticity adjustment method which can solve the above-mentioned problems and which can accurately detect the chromaticity of mixed light.

Means for Solving the Problem

In order to achieve the above object, a phosphor member of the present invention includes: a phosphor plate that converts a portion of excitation light into fluorescent light and emits mixed color light that includes the fluorescent light and a remaining part of the excitation light; and a reflective layer that is provided on the phosphor plate and that transmits a part of the mixed color light and reflects a remaining part of the mixed color light.

A first light source device of the present invention includes the above-mentioned phosphor member.

A second light source device of the present invention includes the above-mentioned phosphor member and an optical sensor that measures chromaticity of mixed color light that passed through the reflective layer.

A projector of the present invention includes the above-mentioned light source device, an image forming element in which light that is emitted from the light source device is modulated to form an image and a projection lens that projects the image.

A chromaticity adjustment method of the present invention, which is a method of adjusting chromaticity of a light source device that includes a phosphor member, the phosphor member including: a phosphor plate that converts a portion of excitation light into fluorescent light and emits mixed color light that includes the fluorescent light and a remaining part of the excitation light; and a reflective layer that is provided on the phosphor plate and that transmits a part of the mixed color light and reflects a remaining part of the mixed color light, the method comprising: receiving mixed color light that passed through the reflective layer of the phosphor member to measure chromaticity of the mixed color light; and adjusting the chromaticity of the mixed color light based on a measured result of the chromaticity.

Effects of the Invention

According to the present invention, since a mixed light of excitation light and fluorescent light can be directly monitored, the chromaticity of the mixed light can be accurately detected.

BRIEF DESCRIPTION OF THE DRAWINGS

FIG. 1A is a schematic diagram for explaining a configuration of a phosphor member according to a first example embodiment of the present invention.

FIG. 1B is a schematic diagram for explaining the configuration of the phosphor member according to the first example embodiment of the present invention.

FIG. 2 is a characteristic diagram showing an example of spectral reflection/transmission characteristics of a reflection layer of the phosphor member shown in FIGS. 1A and 1B.

FIG. 3A is a front view schematically showing a configuration of a phosphor member according to a second example embodiment of the present invention.

FIG. 3B is a cross-sectional view of a part indicated by arrow A of a dotted line in FIG. 3A.

FIG. 3C is a cross-sectional view of a part indicated by arrow B of a dotted line in FIG. 3A.

FIG. 4 is a block diagram showing a configuration of a light source device according to a third example embodiment of the present invention.

FIG. 5 is a schematic diagram showing an example of a configuration in which excitation light and mixed color light are separated by using polarization in the light source device shown in FIG. 4.

FIG. 6 is a schematic diagram for explaining a configuration of a light source device as a comparative example.

FIG. 7 is a block diagram showing a configuration of a light source device according to a fourth example embodiment of the present invention.

FIG. 8 is a flowchart showing a procedure of a chromaticity adjustment method of the light source device shown in FIG. 7.

FIG. 9 is a chromaticity diagram in which the change in the chromaticity of white light emitted by a light source device having no chromaticity adjustment mechanism is plotted in the xy chromaticity coordinate.

FIG. 10 is a diagram showing changes in the illuminance maintenance rate of each of blue light and yellow fluorescent light of the light source device having no chromaticity adjustment mechanism.

FIG. 11 is a block diagram showing a configuration of a light source device according to a seventh example embodiment of the present invention.

FIG. 12 is a flowchart showing a procedure of a gain adjustment method of the light source device shown in FIG. 11.

FIG. 13 is a block diagram showing a configuration of a projector according to an eighth example embodiment of the present invention.

FIG. 14 is a block diagram showing a configuration of a projector according to a ninth example embodiment of the present invention.

EXAMPLE EMBODIMENTS

Next, example embodiments of the present invention are next described with reference to the accompanying drawings.

First Example Embodiment

FIG. 1A and FIG. 1B are schematic diagrams for explaining a configuration of a phosphor member according to a first example embodiment of the present invention disclosure.

As shown in FIGS. 1A and 1B, the phosphor member includes phosphor plate 10 and reflective layer 11 that is provided on phosphor plate 10. Excitation light 13 enters phosphor plate 10 (refer to FIG. 1A). Phosphor plate 10 converts a part of excitation light 13 into fluorescent light 14, and emits mixed light (15a, 15b) including fluorescent light 14 and the remaining part (13a, 13b) of the excitation light. Reflective layer 11 transmits a part of the mixed color light and reflects the remaining part of the mixed color light (refer to FIG. 13).

In the phosphor member of the present example embodiment, the phosphor emits fluorescent light in all directions. A part of fluorescent light 14 emitted by the phosphor enters reflective layer 11. Reflection layer 11 reflects a part of the entered fluorescent light and transmits the remaining part. Of excitation light. 13, the excitation light, which is not used to excite the phosphor, passes through phosphor plate 10 to enter reflection layer 11. Reflection layer 11 reflects a part of the entered excitation light and transmits the remaining part.

Mixed color light 15a that includes both excitation light 13a, which is the reflected light from reflective layer 11, and fluorescent light 14 directed in the opposite direction to reflective layer 11 is emitted from the first surface of the phosphor member which is the surface on the phosphor plate 10 side. Mixed color light 15b that includes both fluorescent light 14 and excitation light 13b and that passed through reflective layer 11 is emitted from the second surface which is the surface of the fluorescent member on reflective layer 11 side. The amount of mixed light 15b is sufficiently smaller than the amount of mixed light 15a. Since the hue of mixed light 15a is the same as the hue of mixed light 15b, the chromaticity of mixed light 15a can be accurately detected by monitoring mixed light 15b.

FIG. 2 shows an example of spectral reflection/transmission characteristics of reflective layer 11. In FIG. 2, the vertical axis represents reflectance (%) and the horizontal axis represents wavelength (nm). As shown in FIG. 2, in the wavelength range of 420 nm to 700 nm, reflective layer 11 has a reflectance of 99% or more on average and a transmittance of less than 1% on average. For example, when the wavelength of excitation light is approximately 450 nm, approximately 99% of the excitation light is reflected by reflective layer 11, and approximately 1% of the excitation light passes through reflective layer 11. When the wavelength of fluorescent light 14 is 480 nm to 700 nm, approximately 99% of the fluorescent light is reflected by reflective layer 11, and approximately 1% of the fluorescent light passes through reflective layer 11. In this way, since the amount of mixed light 15b, which is monitor light, is sufficiently small compared to the amount of mixed light 15a, the ratio of the monitor light can be reduced, and a decrease in brightness can be prevented.

The following modifications can be applied to the phosphor member of the present embodiment.

Phosphor plate 10 may include a transparent substrate and a phosphor layer that includes a phosphor and that is formed on one surface of the substrate. In this case, reflection layer 11 may be formed between the substrate and the phosphor layer, or may be formed on a surface of the substrate opposite to the surface on which the phosphor layer is formed.

Phosphor plate 10 may also include: a plate member that includes first and second segments adjacent to each other in the circumferential direction, wherein the first segment comprises a transmissive substrate and the second segment comprises a metal substrate; and a phosphor layer that includes a phosphor and that is formed circumferentially on the first and second segments. In this case, reflection layer 11 may be formed between the substrate and the phosphor layer, or may be formed on a surface of the substrate opposite to the surface on which the phosphor layer is formed.

The surface of the substrate opposite to the phosphor layer may be a diffusion surface for diffusing light. The diffusion surface may be, for example, a surface to which surface treatment is applied so that it becomes frosted glass. The substrate may also consist of glass or sapphire or may be a eutectic mixture of glass and sapphire.

Phosphor plate 10 may be made of a transparent ceramic or a transparent organic material mixed with a phosphor. In this case, reflective layer 11 may be provided on one surface of the phosphor plate. The transparent ceramic is, for example, transparent alumina or the like. This type of ceramics is also called fine ceramics. The transparent organic material is, for example, a transparent resin or the like.

The phosphor member of the present embodiment can be applied to a light source device. The light source device may include the above-described phosphor member and an optical sensor for measuring the chromaticity of the mixed color light that passed through the reflective layer. The optical sensor may be any sensor capable of measuring the chromaticity of mixed color light. For example, the optical sensor may be a color sensor. Details of the color sensor will be described later.

The light source device may further include a chromaticity adjustment unit that adjusts the chromaticity of mixed color light based on the measurement value of the optical sensor. In this case, the chromaticity adjustment unit may adjust, based on the measurement value of the optical sensor, the rotational frequency of a motor that rotates phosphor plate 10. For example, the chromaticity adjustment unit may adjust the rotation speed of phosphor plate 10 based on the difference between the previous chromaticity measurement value and the current chromaticity measurement value. In addition, the chromaticity adjustment unit may adjust, based on the measurement value of the optical sensor, the gain of the input video signal of the image forming unit in which a plurality of color lights separated from the mixed light are each modulated to form images. For example, the chromaticity adjustment unit may adjust the gain of the input video signal based on the difference between the previous chromaticity measurement value and the current chromaticity measurement value.

The light source device as described above may be applied to a projector. The projector may include the above-mentioned light source device, an image forming element that modulates light emitted from the light source device to form an image, and a projection lens that projects the image.

Second Example Embodiment

FIG. 3A, FIG. 3B, and FIG. 3C are schematic diagrams for explaining a configuration of a phosphor member according to the second example embodiment of the present invention disclosure. FIG. 3A is a front view. FIG. 3B is a cross-sectional view of a part indicated by arrow A of a dotted line in FIG. 3A. FIG. 3C is a cross-sectional view of a part indicated by arrow B of the dotted line in FIG. 3A.

As shown in FIGS. 3A, 3B and 3C, the phosphor member is composed of phosphor wheel 4. Phosphor wheel 4 includes substrate 44, phosphor layer 43, and reflective layer 45. Substrate 44 includes transparent substrate 41 and metal substrate 42.

Transparent substrate 41 and metal substrate 42 integrally form thin disk-shaped substrate 44. Transparent substrate 41 is formed in a fan shape. A portion obtained by removing fan-shaped transparent substrate 41 from substrate 44 is a metal substrate 42. Transparent substrate 41 and metal substrate 42 may be referred to as first and second circumferentially adjacent segments.

The ratio of metal substrate 42 to entire substrate 44 is larger than the ratio of transparent substrate 41 to entire substrate 44. Aluminum which is excellent in heat dissipation and low in cost is preferably used as metal substrate 42, for example. Glass or sapphire which is excellent in heat dissipation can be used as transparent substrate 41, for example. Transparent substrate 41 may be made of a eutectic mixture of glass and sapphire.

Phosphor layer 43 is formed on both transparent substrate 41 and metal substrate 42. As shown in FIG. 3B, reflective layer 45 is provided between transparent substrate 41 and phosphor layer 43. As shown in FIG. 3C, phosphor layer 43 is provided on metallic substrates 42. Phosphor layer 43 is provided over the entire circumference. Reflective layer 45 may be formed on the surface of transparent substrate 41 opposite to the surface on which the phosphor layer 43 is formed. The surface of transparent substrate 41 opposite to phosphor layer 43 may be a diffusion surface for diffusing light. The diffusion surface may be, for example, a surface to which surface treatment is applied to be a frosted glass.

In the phosphor member of the present embodiment, excitation light is irradiated while phosphor wheel 4 rotates. The excitation light is sequentially incident on the first segment (a portion of transparent substrate 41) and the second segment (a portion of metal substrate 42).

In the first segment, a part of fluorescent light emitted by the phosphor in phosphor layer 43 enters reflective layer 45. Reflective layer 45 reflects a part of the entered fluorescent light and transmits the remaining part. Of excitation light, the excitation light, which is not used to excite the phosphor, passes through phosphor layer 43 to enter reflective layer 45. Reflective layer 45 reflects a part of the entered excitation light and transmits the remaining part.

First mixed color light that includes both excitation light, which is light reflected by reflective layer 45, and fluorescent light directed in a direction opposite to reflective layer 45 is emitted from the first surface of phosphor wheel 4. Second mixed color light that includes both fluorescent light and excitation light that are transmitted through reflective layer 45 is emitted from the second surface of phosphor wheel 4 opposite to the first surface. The amount of the second mixed color light is sufficiently smaller than the amount of the first mixed color light. Since the hue of the second mixed color light is the same as the hue of the first mixed color light, the chromaticity of the first mixed color light can be accurately detected by monitoring the second mixed color light. Therefore, the phosphor member of the present embodiment also exhibits the same operation and effect as those of the first example embodiment described above.

In the second segment, a part of fluorescent light emitted by the phosphor in phosphor layer 43 enters metal substrate 42. Metal substrate 42 reflects the entered fluorescent light toward phosphor layer 43. Of excitation light, the excitation light which is not used to excite the phosphor, passes through phosphor layer 43 to enter metal substrate 42. Metal substrate 42 reflects the entered excitation light toward phosphor layer 43. A part of excitation light, which is light reflected by metal substrate 42, excites the phosphor, and the remaining part passes through phosphor layer 43. As a result, mixed color light that includes both fluorescent light and excitation light is emitted from the surface of phosphor layer 43 opposite to metal substrate 42. The hue of this mixed color light is substantially the same as the hue of the second mixed color light.

Also in the phosphor member of the present example embodiment, the modification of the first example embodiment can be applied.

In phosphor wheel 4 shown in FIG. 3, substrate 44 may be composed of only transparent substrate 41. In this case, phosphor layer 43 is formed over the entire circumference of transparent substrate 41. Reflective layer 45 may be formed between phosphor layer 43 and transparent substrate 41, or may be formed on the surface of transparent substrate 41 opposite to phosphor layer 43. The surface of transparent substrate 41 opposite to phosphor layer 43 may be a diffusion surface for diffusing light. The diffusion surface may be, for example, a surface to which surface treatment is applied to become frosted glass.

Third Example Embodiment

FIG. 4 is a block diagram showing a configuration of a light source device according to a third example embodiment of the present invention.

Referring to FIG. 4, the light source device includes excitation light source 101, phosphor member 100, optical sensor 102, and chromaticity adjustment unit 103. Phosphor member 100 is the phosphor member described in the first or second example embodiment.

Excitation light source 101 emits excitation light 101a to excite the phosphor included in phosphor member 100. As excitation light source 101, a solid-state light source such as an LED or an LD can be used.

Phosphor member 100 converts a part of excitation light 101a into fluorescent light, and emits mixed light 100a, 100b that include both the fluorescent light and the remaining part of excitation light 101a. Mixed color light 100a is emitted from the first surface of phosphor member 100. Mixed color light 100b is emitted from the second surface of phosphor member 100 which is a surface opposite to the first surface. The amount of mixed color light 100a is larger than the amount of mixed color light 100b. The hue of mixed light 100a is substantially the same as the hue of mixed light 100b.

Optical sensor 102 receives mixed color light 100b emitted from the second surface of phosphor member 100. Optical sensor 102 may be any sensor capable of measuring the chromaticity of mixed color light 100b. As optical sensor 102, a color sensor can be used.

Chromaticity adjustment unit 103 adjusts the chromaticity of mixed color light 100a based on the measurement value of optical sensor 102. For example, chromaticity adjustment unit 103 may adjust the rotational frequency of the motor which rotates the phosphor plate of phosphor member 100 so that the chromaticity of mixed light 100a becomes a predetermined value. In addition, chromaticity adjustment unit 103 may adjust, based on the measurement value of optical sensor 102, the gain of the video signal that is input to the image forming unit that forms an image by modulating a plurality of color lights separated from mixed light 100a. For example, chromaticity adjustment unit 103 may adjust the gain of the input video signal so that the chromaticity of the synthesized light of each color light emitted from the image forming unit becomes a predetermined value.

In the structure shown in FIG. 4, excitation light 101a and mixed color light 100a can be separated from each other by using polarized light. As an example, FIG. 5 shows a configuration in which excitation light 101a and mixed color light 100a are separated using polarized light.

Referring to FIG. 5, polarizing dichroic mirror 104, ¼ wavelength plate 105, and condenser lens 106 are disposed in an optical path between excitation light source 101 and phosphor member 100. Polarizing dichroic mirror 104 has a property in which, with respect to light in the blue wavelength region, S-polarized light is reflected and P-polarized light is transmitted, and further has a property in which, with respect to non-polarized light, light in at least the yellow wavelength range is transmitted.

Excitation light source 101 is, for example, a blue laser diode. Excitation light source 101 is disposed so that S-polarized blue excitation light 101a enters polarizing dichroic mirror 104. Polarizing dichroic mirror 104 reflects S-polarized blue excitation light 101a from excitation light source 101 toward phosphor member 100.

S-polarized blue excitation light 101a reflected by polarizing dichroic mirror 104 is irradiated onto phosphor member 100 via ¼ wavelength plate 105 and condenser lens 106. ¼ wavelength plate 105 can convert linearly polarized light into circularly polarized light or circularly polarized light into linearly polarized light by applying a phase difference of $\pi/2$ $(=\lambda/4)$ to two polarization components that are orthogonal to each other. Blue excitation light 101a is converted from S-polarized light to circularly polarized light by passing through ¼ wavelength plate 105. Condenser lens 106 condenses circularly polarized blue excitation light 101a that passed through ¼ wavelength plate 203 on phosphor member 100.

Phosphor member 100 emits mixed color lights 100a, 100b that include circularly polarized blue light 101b and yellow fluorescent light 101c. Mixed color light 100b enters optical sensor 102. Mixed color light 100a passes through condenser lens 106 and ¼ wavelength plate 105, and then enters polarizing dichroic mirror 104. At this time, circularly polarized blue light 1b is converted from circularly polarized light to P-polarized light by passing through ¼ wavelength plate 105. P-polarized blue light 101b passes through polarizing dichroic mirror 104. Non-polarized yellow fluorescent light 101c also passes through polarizing dichroic mirror 104.

According to the configuration shown in FIG. 5, excitation light 101a and mixed color light 100a can be separated from each other.

In the configuration shown in FIG. 5, in the portion composed of excitation light source 101 and polarizing dichroic mirror 104, the correspondence relationship between s-polarized light/p-polarized light and reflection/transmission may be reversed.

According to the light source device of the present example embodiment described above, in addition to the effects described in the first example embodiment, it is possible to reduce a change in the hue of the mixed color light when excitation light source 101 is used for a long period of time.

Moreover, according to the light source device of the present example embodiment, by using the phosphor member 100, the following operation and effect can be obtained as compared with the light source device in which the optical sensor is arranged near the optical path of mixed light 100a.

Comparative Example

First, the configuration of a comparative example in which the optical sensor is arranged near the optical path of mixed light 100a and the problems thereof will be described.

FIG. 6 shows a configuration of a light source device of the comparative example. The light source device of this comparative example includes phosphor wheel 110, excitation light source 101, polarizing dichroic mirror 104, ¼ wavelength plate 105, condenser lens 106, and optical sensor 102a. Excitation light source 101 is composed of, for example, 24 blue LDs in 6 rows and 4 columns. In FIG. 6, the broken line arrow indicates blue laser light emitted from the blue LD at the center. The solid line arrow indicates blue laser light emitted from the blue LD in the peripheral portion.

In phosphor wheel 110, a phosphor layer is formed on a metal substrate over the entire circumference. Polarizing dichroic mirror 104, ¼ wavelength plate 105, and condenser lens 106 are the same as those shown in FIG. 5. Blue laser light emitted from excitation light source 101 is irradiated onto the phosphor layer of phosphor wheel 110 via polarizing dichroic mirror 104, ¼ wavelength plate 105, and condenser lens 106. The phosphor layer converts a portion of blue laser light into fluorescent light. Phosphor wheel 110 emits mixed color light that includes fluorescent light and blue laser light toward condenser lens 106.

Optical sensor 102a is arranged near the end of polarizing dichroic mirror 104. Optical sensor 102a receives the outermost light of the luminous flux of mixed color light that passed through polarizing dichroic mirror 104. Here, the mixed color light includes blue laser light emitted by the blue LD in the center portion and blue laser light emitted by the blue LD in the peripheral portion. The blue laser light emitted from the blue LD in the peripheral portion mainly enters optical sensor 102a. Therefore, in the chromaticity measurement result of optical sensor 102a, the blue LD in the peripheral portion is dominant.

Regarding deterioration of the blue LD, there are individual differences between the blue LDs. Therefore, in the configuration, in which the blue LD in the peripheral portion is dominant, as described above, it is difficult to accurately measure the chromaticity of mixed color light when excitation light source 101 deteriorates. For example, when only the blue LD in the center portion deteriorates, since the blue LD in the peripheral portion which has been not deteriorated is dominant, the measurement result of optical sensor 102a is different from the original chromaticity. On the contrary, when only the blue LD in the peripheral portion deteriorates, since the blue LD in the center portion, which has not been deteriorated, is not sufficiently reflected, the measurement result of optical sensor 102a is different from the original chromaticity.

On the other hand, according to the light source device of the present example embodiment, phosphor member 100 emits mixed color lights 100a and 100b. Mixed color lights 100a and 100b each include blue laser light emitted by the blue LD in the center portion and blue laser light emitted by the blue LD in the peripheral portion. The chromaticity of mixed color light 100a is the same as the chromaticity of mixed color light 100b. Since optical sensor 102 can receive the entire mixed color light 100b, the blue LD in the peripheral portion does not dominate as in the comparative example. Therefore, the chromaticity of mixed color light can be accurately detected.

Fourth Example Embodiment

FIG. 7 is a block diagram showing a configuration of a light source device according to a fourth example embodiment of the present invention. Referring to FIG. 7, light source device 2 includes excitation light source 201, polarizing dichroic mirror 202, ¼ wavelength plate 203, condenser lens 204, phosphor wheel 205, color sensor 207, timer 208, motor rotational frequency determination unit 209, memory 210, motor driving unit 211, motor 212, and lens 213. The portion that includes color sensor 207, timer 208, motor driving unit 211, and motor rotational frequency determination unit 209 can be referred to as a chromaticity adjustment unit.

Excitation light source 201 emits s-polarized excitation light toward polarizing dichroic mirror 202. As excitation light source 201, a solid-state light source such as an LD can be used. Here, excitation light source 201 includes a blue LD and a collimator lens for collimating the emitted light of the blue LD. When a light source such as an LED which does not have polarized light is used, a polarization conversion element which aligns incident light with s-polarized light is used.

Polarizing dichroic mirror 202 is disposed so that the blue excitation light (s-polarized light) emitted from excitation light source 201 is incident at an incident angle of approximately 45°. Polarizing dichroic mirror 202 has a property in which, with respect to light in the blue wavelength region, s-polarized light is reflected and p-polarized light is transmitted, and further, light in a wavelength region other than the blue wavelength region is transmitted. Polarizing dichroic mirror 202 reflects the blue excitation light (s-polarized light) from excitation light source 201 toward ¼ wavelength plate 203. In the portion composed of excitation light source 201 and polarizing dichroic mirror 202, the correspondence relationship between s-polarized light/p-polarized light and reflection/transmission may be reversed.

The blue excitation light reflected by polarizing dichroic mirror 202 is irradiated on phosphor wheel 205 via ¼ wavelength plate 203 and condenser lens 204. ¼ wavelength plate 203 can convert linearly polarized light into circularly polarized light or circularly polarized light into linearly polarized light by applying a phase difference of $\pi/2$ ($=\lambda/4$) to two polarization components that are orthogonal to each other. Condenser lens 204 condenses the excitation light that passed through ¼ wavelength plate 203 on phosphor wheel 205.

Phosphor wheel 205 includes a thin disk-shaped transparent substrate. The transparent substrate is rotatable about the center of the disk surface. The transparent substrate is made of sapphire, for example. A reflective layer that has spectral reflection/transmission characteristics as shown FIG. 2 is provided on the transparent substrate. A phosphor layer that includes a phosphor that absorbs blue excitation light and emits yellow fluorescent light is provided on the reflective layer. Both the reflective layer and the phosphor layer are formed in an annular shape along the circumferential direction.

In the phosphor layer, the phosphor is excited by the incident blue excitation light. The excited phosphor emits yellow fluorescent light in all directions. Of the yellow fluorescent light emitted in all directions, the yellow fluorescent light directed toward the reflection layer side is reflected toward the condenser lens 204 side by the reflection layer. Here, since the reflection layer does not constitute the total reflection surface, a part (comma count percent) of the yellow fluorescent light is transmitted through the reflection layer.

A part of blue excitation light that entered the phosphor layer from the condenser lens 204 side reaches the reflection layer without being absorbed by the phosphor. The reflection layer reflects the arrived blue excitation light toward the phosphor layer. Here, since the reflection layer does not constitute a total reflection surface, a part (comma count percent) of the reached blue excitation light is transmitted through the reflection layer. The blue excitation light reflected by the reflection layer again travels in the phosphor layer toward the condenser lens 204 side.

In phosphor wheel 205, the phosphor layer emits white light, which is mixed color light that includes blue excitation light and yellow fluorescent light, toward condenser lens 204. On the other hand, white light, which is mixed color light that includes yellow fluorescent light and blue excitation light that have passed through the reflective layer, is emitted from the back surface of phosphor wheel 205, i.e., the back surface of the surface irradiated with the excitation light. The reflective layer is configured to pass a trace amount of white light necessary for color sensor 207 to measure chromaticity. The chromaticity of white light that passed through the reflection layer substantially matches the chromaticity of white light from the phosphor layer toward the condenser lens 204 side.

Color sensor 207 is disposed at the back surface side of phosphor wheel 205. Color sensor 207 has a function of measuring the chromaticity of white light that passed through the reflective layer. As the chromaticity measurement function, the function of an existing chromatometer can be applied. As an example, a configuration for obtaining chromaticity information from the ratio of RGB will be briefly described below.

Color sensor 207 has a first light receiving surface with a red filter, a second light receiving surface with a green filter, and a third light receiving surface with a blue filter. The red filter transmits light in the red wavelength region of visible light, and absorbs light in other wavelength regions. The green filter transmits light in the green wavelength region of visible light, and absorbs light in other wavelength regions. The blue filter transmits light in the blue wavelength region of visible light, and absorbs light in other wavelength regions. The areas of the first, second and third light receiving surfaces are the same. Color sensor 207 measures the amount of light (red component) incident on the first light receiving surface, the amount of light (green component) incident on the second light receiving surface, and the amount of light (blue component) incident on the third light receiving surface, respectively. Color sensor 207 converts the measurement information into chromaticity information. Color sensor 207 transmits the chromaticity information to motor rotational frequency determination unit 209.

Timer 208 measures the total driving time of light source device 2. Here, the total driving time means the total sum of the times during which the phosphor wheel 205 is irradiated with excitation light.

Motor rotational frequency determination unit 209 includes memory 210. Memory 210 stores chromaticity data for comparison. In the present example embodiment, as the chromaticity for comparison, memory 210 stores chromaticity data measured by color sensor 207 at the time of initial driving, that is, when the driving of light source device 2 is initially performed. Motor rotational frequency determination unit 209 performs a chromaticity adjustment process to be described later, determines the rotational frequency of the motor, and sends the information thereof to motor driving unit 211.

Motor 212 rotates phosphor wheel 205. Motor driving unit 211 rotates motor 212 based on the information of the rotational frequency of the motor transmitted from motor rotational frequency determination unit 209.

Next, the operation of light source device 2 of the present example embodiment for obtaining white light including blue excitation light and yellow fluorescent light will be described in detail.

Excitation light source 201 emits blue excitation light, which is S-polarized light. Blue excitation light (S-polarized light) emitted from excitation light source 201 enters polarizing dichroic mirror 202. Polarizing dichroic mirror 202 reflects the blue excitation light (S-polarized light) toward ¼ wavelength plate 203. The blue excitation light (S-polarized light) is circularly polarized by passing through ¼ wavelength plate 203. The blue excitation light (circularly polarized light) that passed through ¼ wavelength plate 203 enters condenser lens 204. Condenser lens 204 condenses the blue excitation light (circularly polarized light) on phosphor wheel 205.

In phosphor wheel 205, a part of the blue excitation light (circularly polarized light) passes through the phosphor layer to reach the reflective layer. The reflection layer reflects the reached blue excitation light (circularly polarized light) toward the condenser lens 204 side. A part of the blue excitation light (circularly polarized light) reflected by the reflective layer passes through the phosphor layer. The blue excitation light (circularly polarized light) that passed through the phosphor layer enters ¼ wavelength plate 203 via condenser lens 204.

The blue excitation light (circularly polarized light) from the reflection layer passes through ¼ wavelength plate 203 to become p-polarized light. The blue excitation light (p-polarized light) that passed through ¼ wavelength plate 203 passes through polarizing dichroic mirror 202.

In the phosphor layer, the phosphor is excited by the incident blue excitation light. The excited phosphor emits yellow fluorescent light in all directions. Of the yellow fluorescent light emitted in all directions, the yellow fluorescent light directed toward the reflection layer side is reflected toward the condenser lens 204 side by the reflection layer. The phosphor layer emits yellow fluorescent light toward the condenser lens 204 side. The yellow fluorescent light from the phosphor layer passes through condenser lens 204, ¼ wavelength plate 203, and polarizing dichroic mirror 202 in this order.

The blue excitation light and the yellow fluorescent light that each passed through polarizing dichroic mirror 202 enter lens 213 in the same optical path. Lens 213 emits white light, which is mixed color light including blue excitation light and yellow fluorescent light. The white light emitted from lens 213 is light emitted from light source device 2.

On the other hand, from the back surface of phosphor wheel 205, white light, which is mixed color light that includes blue excitation light and yellow fluorescent light that each passed through the reflective layer, is emitted. The white light emitted from the back surface of phosphor wheel 205 enters color sensor 207.

Next, the chromaticity adjustment operation of light source device 2 of the present example embodiment will be described in detail.

FIG. 8 is a flowchart showing a procedure of the chromaticity adjustment method of light source device 2. The chromaticity adjustment method of light source device 2 will be described with reference to FIGS. 7 and 8.

When the time measured by the timer 208 reaches a predetermined time, in step S10, color sensor 207 measures the chromaticity of white light emitted from the back surface of phosphor wheel 205. Then, color sensor 207 outputs chromaticity information based on the measurement result to motor rotational frequency determination unit 209. Here, the predetermined time can be arbitrarily set. For example, 100 hours or 200 hours may be set as a predetermined time.

In step S11, motor rotational frequency determination unit 209 calculates a chromaticity difference, which is the difference between the chromaticity included in the chromaticity information output from color sensor 207 and the chromaticity for comparison (initial chromaticity) stored in memory 210.

In step S12, motor rotational frequency determination unit 209 determines the rotational frequency of motor 212 based on the chromaticity difference calculated in step S11. Then, motor rotational frequency determination unit 209 sends a signal indicating the determined rotational frequency to motor driving unit 211. Here, a table, in which the chromaticity difference and the rotational frequency of motor 212 are stored in association with each other, may be stored in memory 210, and motor rotational frequency determination unit 209 may determine the rotational frequency of motor 212 with reference to the table.

In step S13, motor driving unit 211 receives a signal indicating the rotational frequency of the motor from motor rotational frequency determination unit 209. Motor driving unit 211 rotates motor 212 at the rotational frequency indicated by the received signal (the rotational frequency determined by motor rotational frequency determination unit 209).

According to light source device 2 of the present example embodiment described above, similarly to the third example embodiment, it is possible to reduce a change in the hue of the mixed color light when light source device 2 is used for a long period of time.

Hereinafter, the operation and effect of light source device 2 will be described in detail together with the problem in which the color of white light changes.

First, in a light source device that does not have a chromaticity adjustment mechanism, a problem, in which the color of white light changes due to deterioration of an excitation light source because of aging, will be described.

FIG. 9 is a chromaticity diagram in which a change in chromaticity of white light emitted from a light source device having no chromaticity adjustment mechanism is plotted on xy chromaticity coordinates. The xy chromaticity coordinates are based on tristimulus values XYZ, which are the three primary colors of a color system. In the xy chromaticity coordinates, the yellow color becomes stronger toward the upper right (in the direction of the arrow in the figure). As can be seen from FIG. 9, the chromaticity plot position shifts upward and rightward according to the lapse of time. This means that the yellow component of light emitted from the light source device becomes stronger according to the lapse of time.

FIG. 10 is a diagram showing a change in the illumination maintenance rate of each of the blue light and the yellow fluorescent light of the light source device that does not have the chromaticity adjustment mechanism. In FIG. 10, the vertical axis represents the illumination maintenance ratio (%), and the horizontal axis represents the driving time of the light source. In FIG. 10, the black diamonds indicate blue light, and the black squares indicate yellow fluorescent light. The illuminance of the blue light and the illuminance of the yellow fluorescence when the driving time is 0 (h) are defined as 100 percent, respectively.

As can be seen from FIG. 10, the illuminance of each of blue light and yellow fluorescent light decreases according to the lapse of time. The decrease rate of the illuminance differs between blue light and yellow fluorescent light. The decrease rate of the illuminance of the blue light is larger than the decrease rate of the illuminance of the yellow fluorescent light. This means that, with respect to blue light and yellow fluorescent light included in white light emitted by the light source device, the ratio of the yellow fluorescent light to the blue light increases according to the lapse of time. This result is consistent with that of FIG. 9.

Namely, from the results of FIGS. 9 and 10, it can be seen that the yellowness of the white light emitted from the light source device increases when the light source device is used for a long period of time.

According to light source device 2 of the present example embodiment, the problem in which the yellowness of white light becomes strong can be solved as follows.

For example, when timer 208 reaches a predetermined time, if the yellow component is increased with respect to the blue component due to a change in the ratio of the blue and yellow components included in the white light, motor rotational frequency determination unit 209 decreases the rotational frequency of motor 212. When the rotational frequency of motor 212 decreases, the rotational speed of phosphor wheel 205 decreases. When the rotation speed of phosphor wheel 205 decreases, since the cooling effect accompanying the rotation of the wheel decreases and the irradiation time of excitation light per unit area increases, the temperature of the portion of phosphor wheel 205 irradiated with the excitation light increases. Thus, the temperature of the phosphor increases, and as a result, the internal quantum efficiency decreases. If the internal quantum efficiency decreases, the amount of yellow fluorescent light emitted by the phosphor decreases. As a result, the yellow component of white light emitted by phosphor wheel 205 decreases. Therefore, it is possible to prevent a change in chromaticity of white light emitted from light source device 2.

In addition, when the phosphor is used for a long period of time, the amount of fluorescent light gradually decreases. Due to deterioration of the phosphor because of aging, the ratio of the blue and yellow components contained in the white light changes. For example, if the degradation rate of the phosphor is higher than the degradation rate of the excitation light source, the ratio of yellow fluorescent light to blue light decreases according to the lapse of time. As a result, in the color component of white light emitted from the light source device, blueness may increase according to the lapse of time.

According to light source device 2 of the present example embodiment, the problem in which blueness of white light increases can be solved as follows.

For example, when timer 208 reaches a predetermined time, if the blue component is increased with respect to the yellow component due to a change in the ratio of the blue and yellow components included in white light, motor rotational frequency determination unit 209 increases the rotational frequency of motor 212. When the rotational frequency of motor 212 increases, the rotational speed of phosphor wheel 205 increases. When the rotation speed of phosphor wheel 205 increases, since the cooling effect accompanied by the rotation of the wheel increases and since the irradiation time of the excitation light per unit area decreases, the temperature of the portion of phosphor wheel 205 irradiated with the excitation light of phosphor wheel 205 decreases. Thus, the temperature of the phosphor decreases, and as a result, the internal quantum efficiency increases. If the internal quantum efficiency increases, the amount of yellow fluorescent light emitted by the phosphor increases. As a result, the yellow component of white light emitted by phosphor wheel 205 increases. Therefore, it is possible to prevent a change in chromaticity of white light emitted from light source device 2.

Fifth Example Embodiment

The light source device according to the fifth example embodiment of the present invention has the same configuration as the light source device 2 according to the fourth example embodiment except that the phosphor wheel is different.

In the light source device of the present example embodiment, phosphor wheel 4 as shown in FIGS. 3A, 3B and 3C is used. Phosphor wheel 4 can be used in the same manner as phosphor wheel 205 described in the fourth example embodiment.

The light source device of the present example embodiment exhibits the same operation and effect as those of light source device 2 of the fourth example embodiment. However, most of substrate 44 of phosphor wheel 4 is made of metal substrate 42 that has excellent heat radiation properties. Therefore, phosphor wheel 4 has excellent heat radiation properties as compared with phosphor wheel 205. Further, since metal substrate 42 is inexpensive, the cost can be reduced as compared with phosphor wheel 205.

Sixth Example Embodiment

The light source device according to the sixth example embodiment of the present invention has the same configuration as light source device 2 according to the fourth example embodiment except that the phosphor wheel is different.

In the light source device of the present example embodiment, the phosphor wheel includes a thin disk-shaped substrate and a reflective layer. The substrate is made of a ceramic crystal. The ceramic crystal is made of a transparent material containing a fluorescent material. The transparent material is, for example, an inorganic crystal, glass, or polymer material. The fluorescent material is, for example, a rare earth ion, a transition metal ion, an organic dye molecule, a phosphor, or the like. Inorganic crystals doped with rare earth ions, such as cerium-doped yttrium aluminum garnet (Ce:YAG), or inorganic crystals doped with transition metal ions, such as chromium-doped sapphire or titanium-doped sapphire, can be used as the fluorescent material. In the present example embodiment, for example, a phosphor of Ce:YAG ceramics crystal is used for the substrate. A reflective layer is provided on one surface of the substrate. The reflective layer is the same as that described in the second example embodiment.

The light source device of the present example embodiment also exhibits the same operation and effect as those of light source device 2 described in the fourth example embodiment.

Seventh Example Embodiment

FIG. 11 is a block diagram showing a configuration of a light source device according to a seventh example embodiment of the present invention. The light source apparatus shown in FIG. 11 is provided with gain determination unit 220 instead of timer 208 and motor rotation speed determination unit 209 of light source apparatus 2 of the fourth embodiment. Configurations other than the gain determination unit 220 are the same as those of the fourth embodiment. In FIG. 11, for convenience, excitation light source 201, polarizing dichroic mirror 202, ¼ wavelength plate 203, condenser lens 204, motor driver 211, and lens 213 are omitted.

Display panel 222 and input signal 223 constitute a part of a projector to which the light source device of the present example embodiment is applied. Display panel 222 is, for example, a liquid crystal display panel or a DMD. Display panel 222 forms an image for each color light separated from mixed color light (white light), which is light emitted from phosphor wheel 205. In the case of the single plate type, display panel 222 forms images of respective colors in a time-division manner. In addition, a plurality of display panels which modulate a plurality of color lights to form an image, respectively, may be provided as display panel 222, the plurality of color lights being separated from mixed color light which is light emitted from phosphor wheel 205. Input signal 223 is an input video signal and includes a video signal corresponding to each color light. For example, input signal 223 includes a video signal corresponding to each color of RGB.

Gain determination unit 220 includes memory 221. Memory 221 stores chromaticity data for comparison. In the present example embodiment, as the chromaticity for comparison, memory 210 stores chromaticity data measured by color sensor 207 at the time of initial driving (that is, when the light source device is firstly driven).

Gain determination unit 220 adjusts the gain of input signal 223 of display panel 222 based on the measurement value of color sensor 207. For example, gain determination unit 220 adjusts the gain of the input video signal so that the chromaticity of synthesized light of each color light emitted from display panel 222 becomes a predetermined value. This gain adjustment process can be referred to as a chromaticity adjustment process.

As an example, FIG. 12 shows a procedure of a RGB gain adjustment process. Hereinafter, the RGB gain adjustment process will be described in detail with reference to FIGS. 11 and 12.

In step S20, color sensor 207 measures the chromaticity of white light emitted from the back surface of phosphor wheel 205. Color sensor 207 outputs chromaticity information based on the measurement result to gain determination unit 220. Here, the measurement start timing of color sensor 207 can be arbitrarily set.

In step S21, gain determination unit 220 calculates a chromaticity difference, which is a difference between the chromaticity included in the chromaticity information output from color sensor 207 and the chromaticity for comparison (initial chromaticity) stored in memory 221.

In step S22, gain determination unit 220 determines RGB gain adjustment values based on the chromaticity difference calculated in step S21. For example, gain determination unit 220 determines the RGB gain adjustment values based on the chromaticity difference so that the hue of synthesized light (projection light) of each color light emitted from display panel 222 does not change, in other words, so that the chromaticity of the synthesized light becomes a predetermined value. Here, a table, in which the chromaticity difference and the gain adjustment values of RGB are stored in association with each other, may be stored in memory 221, and gain determination unit 220 may determine the gain adjustment values of RGB with reference to the table.

In step S23, gain determination unit. 220 performs gain adjustment for each video signal of RGB based on the gain adjustment values of RGB determined in step S22.

The light source device of the present embodiment also exhibits the same operation and effect as those of the fourth example embodiment.

In the light source device of the present embodiment, the configurations of the fifth example embodiment and the sixth example embodiment may be applied.

Eighth Example Embodiment

FIG. 13 is a block diagram showing a configuration of DLP (Digital Light Processing) projector 5 according to an eighth example embodiment of the present invention. As shown in FIG. 13, projector 5 includes light source device 2, color wheel 501, light tunnel 502, TIR prism (total internal reflection prism) 503, DMD (Digital Micromirror Device)

504, projection lens 505, and lens group 506. Light source device 2 has been described in the fourth example embodiment.

Color wheel 501 has a thin disk shape and is rotatable about a central axis of the disk surface. Red, green and blue filters are each provided on the surface of color wheel 501. The red, green and blue filters are arranged in order in the circumferential direction. The red filter has a characteristic in which light in a red wavelength region is transmitted and light in a wavelength region other than the red wavelength region is absorbed. The green filter has a characteristic in which light in a green wavelength region is transmitted and light in a wavelength region other than the green wavelength region is absorbed. The blue filter has a characteristic in which light in a blue wavelength region is transmitted and light in a wavelength region other than the blue wavelength region is absorbed.

Light tunnel 502 is disposed at a position where each monochromatic light that passed through color wheel 501 can enter. Light tunnel 502 is an element that homogenizes the illuminance distribution of incident light.

TIR prism 503 is disposed at a position where light emitted from light tunnel 502 can enter. TIR prism 503 is a laminate of two triangular prisms, and includes an air layer between the prisms.

DMD504 is disposed at a position where light from TIR prism 503 can enter. DMD504 includes an imaging surface comprising a plurality of micromirrors that are arranged in two dimensions. DMD504 forms images by modulating incident light in accordance with input video signals. DMD504 is an example of an imaging device.

In projector 5, light source device 2 emits white light. The white light emitted from light source device 2 enters color wheel 501. When color wheel 501 rotates, white light is sequentially irradiated to the red, green, and blue filters of the color wheel 501. Color wheel 501 sequentially emits red light, green light, and blue light.

Red light, green light, and blue light emitted from color wheel 501 enter light tunnel 502. In light tunnel 502, the illuminance distributions of the entered red light, green light, and blue light are made uniform. Light tunnel 502 sequentially emits red light, green light, and blue light.

Red light, green light, and blue light emitted from light tunnels 502 enter DMD504 through TIR prisms 503. DMD504 modulates the red light to form a red image, modulates the green light to form a green image, and modulates the blue light to form a blue image. DMD504 sequentially emits red image light, green image light, and blue image light. The red image light, the green image light, and the blue image light enter projection lens 505 via TIR prism 503. Projection lenses 505 overlappingly projects the red image, the green image, and the blue image formed by DMD504 on a screen (not shown).

In projector 5 shown in FIG. 13, instead of light source device 2, any of the light source devices of the third example embodiment, the fifth example embodiment, the sixth example embodiment, and the seventh example embodiment may be used.

Ninth Example Embodiment

FIG. 14 is a block diagram showing a configuration of an LCD (liquid crystal display) projector 6 according to a ninth example embodiment of the present invention disclosure. As shown in FIG. 14, projector 6 includes light source device 2, fly-eye lens system 601, dichroic mirrors 602R and 602G, lens 603, mirror 604, lens 605, mirror 606, mirror 607, lenses 608R, 608G, and 608B, liquid crystal displays 609R, 609G, and 609B, cross dichroic prism 610, and projection lens 611. Light source device 2 has been described in the fourth example embodiment.

Fly-eye lens system 601 homogenizes the illuminance distribution of light that entered fly-eye lens system 601 and emits the light. Fly-eye lens system 601 is disposed at a position where white light emitted from light source device 2 can enter.

Dichroic mirror 602R has a characteristic in which light in a red wavelength region is reflected and light in a wavelength region other than the red wavelength region is transmitted. Dichroic mirror 602G has a characteristic in which light in a green wavelength region is reflected and light in a wavelength region other than the green wavelength region is transmitted.

Dichroic mirror 602R is disposed so that white light emitted by fly-eye lens system 601 is incident at an incident angle of approximately 45°. Red light reflected by dichroic mirror 602R enters liquid crystal display 609R via mirror 607 and lens 608R.

Dichroic mirror 602G is disposed so that light transmitted through dichroic mirror 602R (including blue and green components) is incident at an incident angle of approximately 45°. Green light reflected by dichroic mirror 602G enters liquid crystal display 609G via lens 608G.

Blue light transmitted through dichroic mirror 602G enters liquid crystal display 609B through lens 603, mirror 604, lens 605, mirror 606, and lens 608B. Here, lens 603 and lens 605 comprise a relay lens.

Liquid crystal display 609R forms a red image by modulating incident red light in accordance with an input video signal (R). Liquid crystal display 609B forms a blue image by modulating incident blue light in accordance with an input video signal (B). Liquid crystal display 609G forms a green image by modulating incident green light in accordance with an input video signal (G).

The red image light emitted from liquid crystal display 609R, the blue image light emitted from liquid crystal display 609B, and the green image light emitted from liquid crystal display 609G enter projection lens 611 through cross dichroic prism 610. Cross dichroic prism 610 combines the image lights of the respective colors emitted from liquid crystal displays 609R, 609G, and 609B. Here, liquid crystal displays 609R, 609G, and 609B are examples of image forming elements.

Projection lens 611 projects the red image light, the blue image light, and the green image light that entered from cross dichroic prism 610 on a screen (not shown).

In projector 6 shown in FIG. 14, instead of light source device 2, any of the light source devices of the third example embodiment, the fifth example embodiment, the sixth example embodiment, and the seventh example embodiment may be used.

Each of the embodiments described above is an example of the present invention, and is not intended to limit the present invention. The configuration of the present invention can be changed within the scope of technical ideas that can be understood by any person of ordinary skill in the art.

Moreover, the present invention may take forms such as, but not limited to, the following Supplementary Notes 1 to 17.

[Supplementary Note 1]

A phosphor member comprising:

a phosphor plate that converts a portion of excitation light into fluorescent light and emits mixed color light that includes the fluorescent light and a remaining part of the excitation light; and a reflective layer that is provided on the phosphor plate and that transmits a part of the mixed color light and reflects a remaining part of the mixed color light.

[Supplementary Note 2]

The phosphor member according to Supplementary Note 1, wherein the phosphor plate includes:

a transparent substrate; and a phosphor that is formed on one surface of the substrate and contains a phosphor.

[Supplementary Note 3]

The phosphor member according to Supplementary Note 1, wherein the phosphor plate includes:

a plate member that includes first and second segments adjacent to each other in a circumferential direction, wherein the first segment comprises a transmissive substrate and the second segment comprises a metal substrate; and a phosphor layer that is formed on the phosphor plate along the circumferential direction and contains a phosphor.

[Supplementary Note 4]

The phosphor member according to Supplementary Note 2 or 3, wherein the reflective layer is formed between the substrate and the phosphor layer.

[Supplementary Note 5]

The phosphor member according to Supplementary Note 4, wherein a surface of the substrate opposite to the phosphor layer is a diffusion surface that diffuses light.

[Supplementary Note 6]

The phosphor member according to Supplementary Note 2 or 3, wherein the reflective layer is formed on a surface of the substrate opposite to a surface on which the phosphor layer is formed.

[Supplementary Note 7]

The phosphor member according to any one of Supplementary Notes 2 to 6, wherein the substrate is made of glass or sapphire or a eutectic mixture of glass and sapphire.

[Supplementary Note 8]

The phosphor member according to Supplementary Note 1, wherein the phosphor plate is made of a transmissive ceramic or a transmissive organic material in which a phosphor is mixed, and the reflective layer is provided on a first surface which is one surface of the phosphor plate.

[Supplementary Note 9]

A light source device comprising the phosphor member according to any one of Supplementary Notes 1 to 8.

[Supplementary Note 10]

A light source device comprising:

the phosphor member according to any one of Supplementary Notes 1 to 8; and an optical sensor that measures chromaticity of mixed color light that passed through the reflective layer.

[Supplementary Note 1]

The light source device according to Supplementary Note 10, further comprising a chromaticity adjustment unit that adjusts the chromaticity of the mixed color light based on a measurement value of the optical sensor.

[Supplementary Note 12]

The light source device according to Supplementary Note 11, wherein the chromaticity adjustment unit adjusts, based on the measurement value of the optical sensor, a rotational frequency of a motor that rotates the phosphor plate.

[Supplementary Note 13]

The light source device according to Supplementary Note 11, wherein the chromaticity adjustment unit adjusts, based on the measurement value of the optical sensor, a gain of an input video signal of an image forming unit in which a plurality of color lights, which are separated from the mixed color light, are respectively modulated to form an image.

[Supplementary Note 14]

A projector comprising:

the light source device according to any one of Supplementary Notes 9 to 13;

an image forming element in which light that is emitted from the light source device is modulated to form an image; and a projection lens that projects the image.

[Supplementary Note 15]

A method of adjusting chromaticity of a light source device that includes a phosphor member, the phosphor member including: a phosphor plate that converts a portion of excitation light into fluorescent light and emits mixed color light that includes the fluorescent light and a remaining part of the excitation light; and a reflective layer that is provided on the phosphor plate and that transmits a part of the mixed color light and reflects a remaining part of the mixed color light, the method comprising:

receiving mixed color light that passed through the reflective layer of the phosphor member to measure chromaticity of the mixed color light; and adjusting the chromaticity of the mixed color light based on a measured result of the chromaticity.

[Supplementary Note 16]

The chromaticity adjustment method of Supplementary Note 15, further comprising adjusting a rotation speed of the phosphor plate based on a difference between a previous chromaticity measurement and a current chromaticity measurement.

[Supplementary Note 17]

The chromaticity adjustment method according to Supplementary Note 15, further comprising adjusting, based on a difference between a previous chromaticity measurement and a current chromaticity measurement, a gain of an input video signal of an image forming unit in which a plurality of color lights, which are separated from the mixed color light, are respectively modulated to form an image.

This application claims the benefits of priority based on PCT/JP2017/42264 filed Nov. 24, 2017, the disclosures of which are incorporated herein by reference in their entirety.

EXPLANATION OF REFERENCE NUMBERS

10 Phosphor plate
11 Reflective layer
13 13a, 13b Excitation light.
14 Fluorescent light
15a, 15b Mixed color light

The invention claimed is:

1. A phosphor member, comprising:

a phosphor plate that converts a portion of excitation light into fluorescent light and emits mixed color light that includes the fluorescent light and a remaining part of the excitation light; and a reflective layer that is provided on said phosphor plate and that transmits a part of the mixed color light and reflects a remaining part of the mixed color light, wherein a direction of a reflection of a majority of reflected mixed color light is toward a direction that the excitation light enters said phosphor plate, and wherein a same reflective section of the reflective layer reflects the remaining part of the mixed color light toward a same direction that the excitation light enters said phosphor plate in a surface of the reflective layer that faces said phosphor plate, and transmits the part of the mixed color light to another surface of the reflective layer that faces away from said phosphor plate.

2. The phosphor member according to claim 1, wherein said phosphor plate includes:
a transparent substrate; and
a phosphor that is formed on one surface of the substrate and contains a phosphor.

3. The phosphor member according to claim 1, wherein said phosphor plate includes:
a plate member that includes first and second segments adjacent to each other in a circumferential direction, wherein said first segment comprises a transmissive substrate and said second segment comprises a metal substrate; and
a phosphor layer that is formed on said phosphor plate along the circumferential direction and contains a phosphor.

4. The phosphor member according to claim 2, wherein said reflective layer is formed between said substrate and said phosphor layer.

5. The phosphor member according to claim 4, wherein a surface of said substrate opposite to said phosphor layer comprises a diffusion surface that diffuses light.

6. The phosphor member according to claim 2, wherein said reflective layer is formed on a surface of said substrate opposite to a surface on which said phosphor layer is formed.

7. The phosphor member according to claim 2, wherein said substrate comprises glass or sapphire, or a eutectic mixture of the glass and the sapphire.

8. The phosphor member according to claim 1, wherein said phosphor plate comprises a transmissive ceramic or a transmissive organic material in which a phosphor is mixed, and wherein said reflective layer is provided on a first surface which comprises one surface of said phosphor plate.

9. A light source device comprising the phosphor member according to claim 1.

10. A light source device comprising:
the phosphor member according to claim 1; and
an optical sensor that measures chromaticity of mixed color light that passed through said reflective layer.

11. The light source device according to claim 10, further comprising a chromaticity adjustment unit that adjusts the chromaticity of the mixed color light based on a measurement value of said optical sensor.

12. The light source device according to claim 11, wherein said chromaticity adjustment unit adjusts, based on the measurement value of said optical sensor, a rotational frequency of a motor that rotates said phosphor plate.

13. The light source device according to claim 11, wherein said chromaticity adjustment unit adjusts, based on the measurement value of said optical sensor, a gain of an input video signal of an image forming unit in which a plurality of color lights, which are separated from the mixed color light, are respectively modulated to form an image.

14. A projector comprising:
the light source device according to claim 9;
an image forming element in which light that is emitted from the light source device is modulated to form an image; and
a projection lens that projects the image.

15. A method of adjusting chromaticity of a light source device that includes a phosphor member, the phosphor member including a phosphor plate that converts a portion of excitation light into fluorescent light and emits mixed color light that includes the fluorescent light and a remaining part of the excitation light, and a reflective layer that is provided on said phosphor plate and that transmits a part of the mixed color light and reflects a remaining part of the mixed color light, said method comprising:
receiving mixed color light that passed through said reflective layer of said phosphor member to measure chromaticity of the mixed color light; and
adjusting the chromaticity of the mixed color light based on a measured result of the chromaticity,
wherein a direction of a reflection of a majority of reflected mixed color light is toward a direction that the excitation light enters said phosphor plate, and
wherein a same reflective section of the reflective layer reflects the remaining part of the mixed color light toward a same direction that the excitation light enters said phosphor plate in, a surface of the reflective layer that faces said phosphor plate, and transmits the part of the mixed color light to another surface of the reflective layer 4 that faces away from said phosphor plate.

16. The chromaticity adjustment method of claim 15, further comprising adjusting a rotation speed of said phosphor plate based on a difference between a previous chromaticity measurement and a current chromaticity measurement.

17. The chromaticity adjustment method according to claim 15, further comprising adjusting, based on a difference between a previous chromaticity measurement and a current chromaticity measurement, a gain of an input video signal of an image forming unit in which a plurality of color lights, which are separated from the mixed color light, are respectively modulated to form an image.

18. The phosphor member according to claim 1, wherein the excitation light enters said phosphor plate from a surface of said phosphor plate that is located in an opposing side of said phosphor plate with respect to another surface of said phosphor plate on which the reflective layer is disposed.

19. The phosphor member according to claim 1, wherein, in the direction that the excitation light enters said phosphor plate, the excitation light passes through said phosphor layer before reaching to the reflective layer.

* * * * *

UNITED STATES PATENT AND TRADEMARK OFFICE
CERTIFICATE OF CORRECTION

| | |
|---|---|
| PATENT NO. | : 11,340,444 B2 |
| APPLICATION NO. | : 16/757282 |
| DATED | : May 24, 2022 |
| INVENTOR(S) | : Isao Takahashi |

It is certified that error appears in the above-identified patent and that said Letters Patent is hereby corrected as shown below:

On the Title Page

(30) Foreign Application Priority Data should read:
Nov. 24, 2017   (WO) .................... PCT/JP2017/042264

Signed and Sealed this
Twentieth Day of August, 2024

Katherine Kelly Vidal
*Director of the United States Patent and Trademark Office*